May 2, 1944.　　　E. O. RICHTER　　　2,348,150
EXTENDABLE WING FLAP
Filed June 2, 1941　　　2 Sheets-Sheet 2
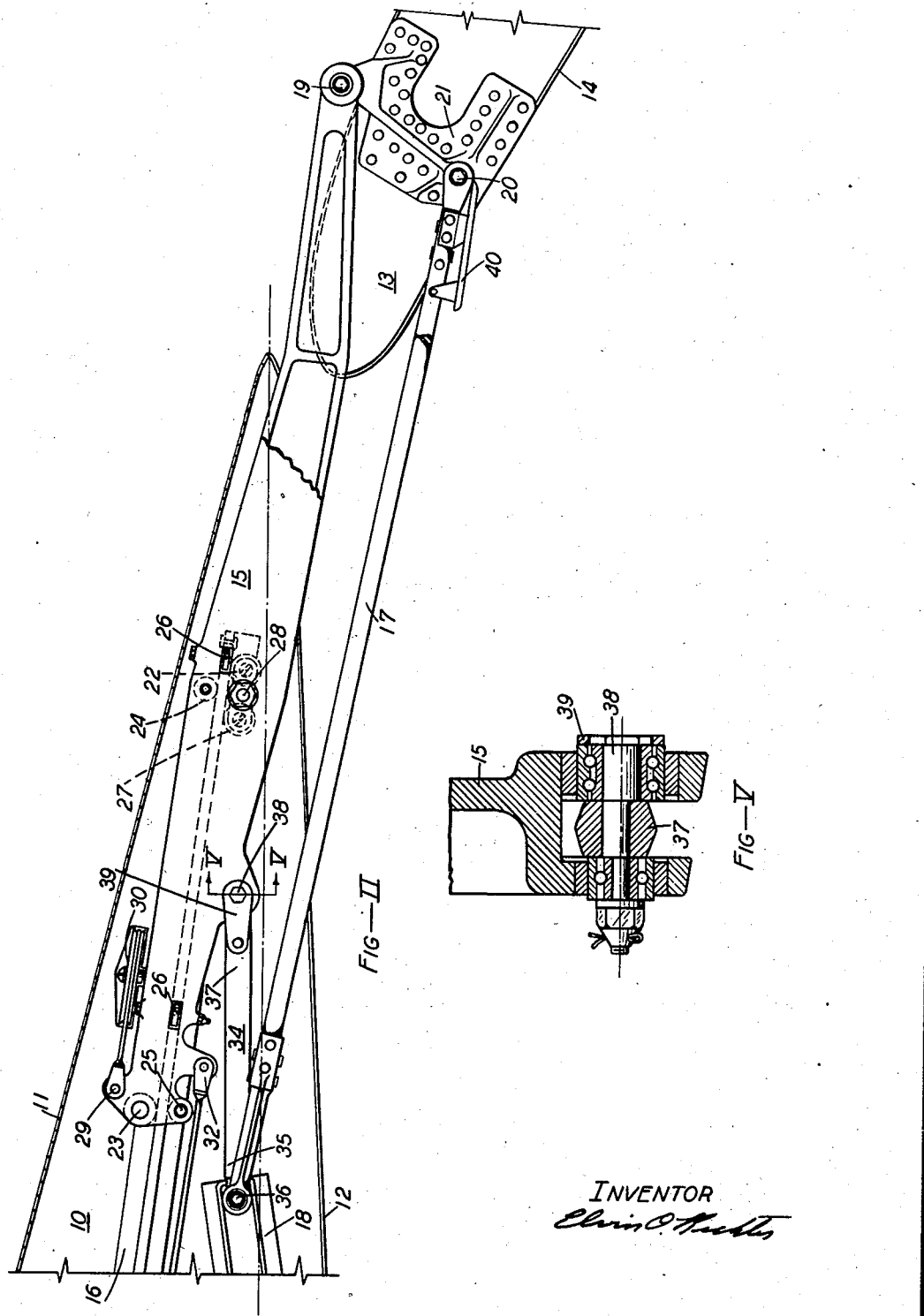
INVENTOR Patented May 2, 1944

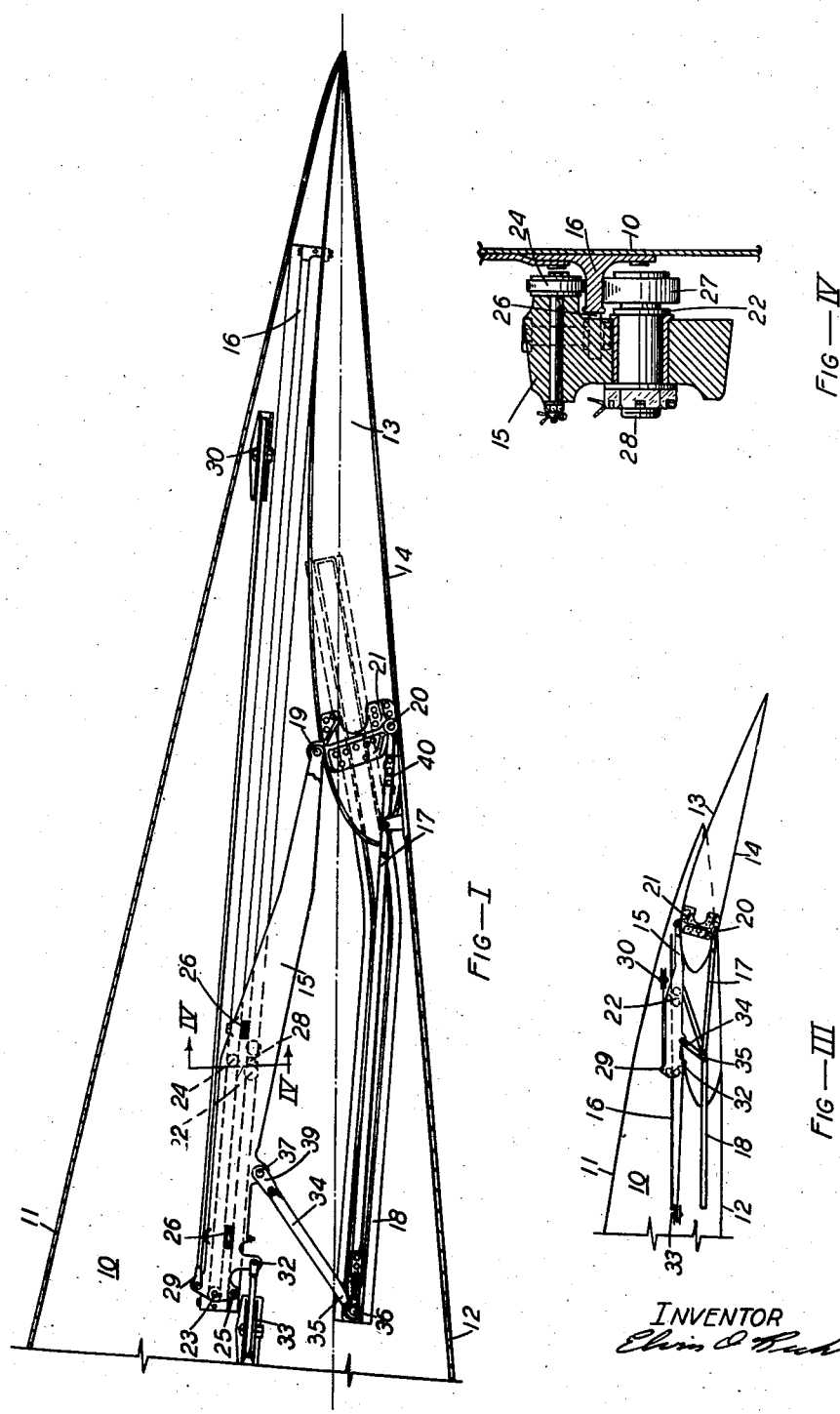

2,348,150

UNITED STATES PATENT OFFICE 2,348,150

EXTENDIBLE WING FLAP

Elvin O. Richter, Burbank, Calif., assignor to Lockheed Aircraft Corporation, Burbank, Calif.

Application June 2, 1941, Serial No. 396,347

5 Claims. (Cl. 244—42)

This invention relates to improvements in flap extending mechanisms for controlling the extension and angle of attack of flaps used to increase wing area for take-off and landing and to serve as landing brakes.

Extensible trailing and nose flaps of the general type under consideration have been proposed and used heretofore as they are necessary to improve the take-off characteristics and reduce the landing speed of modern high performance airplanes, since without such flaps the spread between landing speed and top speed is a limiting factor in design, some high speed craft having dangerously high landing speeds, which limit their use to well developed landing fields having long and smooth runways. Heretofore such flaps have been extended from their nested position in a pocket within the wing profile by means either of arcuate or straight tracks, levers or linkage, the problem being to obtain the most desirable flap position and angle not only at the extreme extension but at intermediate points. For take-off purposes a trailing edge flap should desirably form a continuation of the upper surface of the wing when partially extended, except for an offset position thereof to form an air gap; while for landing the flap should be capable of both full extension and considerable downward pivotal movement, both to increase the lift and to act as a brake. It will therefore be evident that uniform arcuate or straight line movement of the flap projecting mechanism can not fulfill both requirements. It has heretofore been proposed that a straight line projection of the flap be used, followed by pivotal movement thereof after it reaches its extreme position; but such an arrangement does not permit fairing in the flap as an extension of the upper surface of the main wing at intermediate positions of the flap, such as would desirably be used for take-off. It is accordingly an object of this invention to provide an improved flap extending mechanism that is adapted to give maximum efficiency in flap position, angle and gap between the main airfoil and the flap throughout the range of movement of the flap.

It is another object of this invention to provide an improved flap projecting and guiding mechanism that can be designed for maximum efficiency in flap positioning at intermediate positions as well as extreme positions, and also wherein the angle of attack of the flap can be varied as desired throughout its range of movement. With the arrangement of this invention either or both guiding tracks can be variously curved to control both flap position angle and gap between the flap and the main airfoil throughout the movement of the flap.

It is a further object of this invention to provide means for adjusting the leading and trailing flap edge positions to fair the flap into the surface of the main wing when nested therein, whereby the flap will present the minimum drag when nested into the wing, without exposed or projecting parts or breaks in the main wing profile.

It is also an object of this invention to provide an improved flap guiding mechanism entirely housed within the wing profile, while capable of projecting the flap beyond the trailing edge thereof to provide a slot effect for preventing or delaying the stall or burble of the air flow over the upper surface of the flap when the latter is tilted beyond its normal stalling angle for use as a landing brake.

It is still another object of this invention to provide an improved flap or auxiliary airfoil guiding mechanism wherein separate guiding tracks or channels control the movement of spaced levers in such a way as to approximate a quadrilateral figure having one side controlled by the tracks to vary the tilt of a flap carried by the opposite side thereof.

It is also an object of this invention to provide the proper gap between the main airfoil and the flap at all points in the range of the flap motion thus insuring the proper aerodynamic conditions for satisfactory operation.

Other and further important objects of this invention will be apparent from the disclosures in the specification and the accompanying drawings.

This invention in its preferred form is illustrated in the drawings and hereinafter more fully described.

In the drawings:

Figure I is a fragmentary cross-section through the trailing edge of a wing, showing the arrangement of the trailing airfoil or flap and its guiding and extending mechanism, the flap being shown in its retracted or nested position.

Figure II is an enlarged fragmentary showing similar to Figure I wherein the flap is shown in its fully projected and deflected position.

Figure III is a diagrammatic showing, to a reduced scale, of the flap at an intermediate extension to illustrate how it fairs with the upper wing surface, while providing a gap for the flow of air therebetween.

Figure IV is an enlarged section on the line IV—IV of Figure I showing the track and guide roller mounting.

Figure V is an enlarged section on the line V—V of Figure II, showing the eccentric pivot adjustment which permits accurate alignment of the flap in its nested position.

As shown on the drawings:

While the flap control of this invention could be applied either to the nose or trailing edge flaps, I have chosen to illustrate the latter, wherein the trailing edge of a wing is shown in the main views, comprising a rib or bulkhead 10 supporting an upper skin 11 and lower skin 12, the latter being cut away to form a pocket or opening for a flap or auxiliary airfoil 13 which is adapted to nest inside the wing profile with its lower surface 14 forming an aligned continuation of the lower skin 12 of the wing. Preferably, the flap is of a size that can be adequately handled by supporting and guiding mechanism at each end thereof, so that in a large airplane it would be desirable to use a plurality of flaps for each wing, a corresponding number of main wing ribs or bulkheads 10 each serving to support the edges of adjacent flaps. With this arrangement Figure IV would have the tracks and structure symmetrically duplicated on either side in the case of the intermediate ribs, but it is considered unnecessary to complicate the drawings by such a showing.

The flap or airfoil 13 is suspended or supported from the ribs 10 by a lever 15 guided by a track 16, and the angle of the flap is controlled by a second lever 17 guided by a second track 18. The flap ends of the two levers on each end of the flap are pivoted at 19 and 20 to brackets 21 thereon; for convenience Figures I and II show one bracket in full lines with the near side levers broken away adjacent thereto to show the far side levers and tracks against the background of a rib 10. As shown and described herein, the lever 15 is intended to carry the major load on the flap, and to project and retract the same, while the second lever 18 is used to control the angle of the flap. Since the first lever 15 controls the projection of the flap, it is guided on its track 16 by a trolley 22 near the mid-point thereof, with a second guide roller 23 at the forward end of the lever. While both or either of the tracks 16 and 18 could be of channel or beam form, and either lever and track could be used as the projecting control, I have chosen to show a T type track for the upper lever, which requires rollers on both sides of the leg of the T, to stabilize the lever. Accordingly, I provide idler rollers 24 opposite the trolley 22 and 25 opposite the roller 23. Also, rollers 26 bear against the edge of the leg of the T to prevent cocking of the lever. It will be noted that the trolley 22 comprises two rollers 27 having a common pivot 28 to permit alignment thereof. With this arrangement the T track 16 can be straight or curved as desired, to project the flap in controlled relationship with the trailing edge of the upper skin, to provide a slot in connection therewith, the arrangement being indicated in the diagrammatic showing of Figure III wherein the flap is shown as partially extended.

Control of the outward (or rearward) and return movements of the flap may conveniently be arranged as a remotely controlled cable system wherein one end of a cable 29 is led over a pulley 30 above and near the outer end of the track 16, and is attached to the lever 15 at its inboard (or forward) end, to draw the same outwardly; a second cable end 32 being led over a pulley 33 below, and attached to the lever 15 to retract the same. Any convenient method of remotely operating these cables, at the will of the pilot, may be incorporated in the general design, manual and hydraulic systems having been heretofore used for such purposes.

The angle of the flap relative to the mean chord of the wing is controlled by the second lever 17 and its track 18 in connection with a short link 34, pivoted at one end 35 to the end of the lever 17 which carries a roller 36 engaging in the channel of the track 18, and pivoted at its other end 37 to the first lever 15. This arrangement forms a quadrilateral figure comprising the levers 15 and 17, their mounting bracket 21 on the flap 13, and the link 34, so that variation of the spacing of the link pivots 35 and 37 will result in pivotal movement of the link 34 with a distortion of the quadrilateral figure that results in a proportionate pivotal movement of the flap 13, thus controlling its angle. This result can be accomplished to any desired extent at any point in the flap travel by variation in either or both of the tracks 16 and 18. I have chosen to show the track 18 as arranged to begin to tilt the flap to an increased angle of attack as it is projected beyond its mid-point and to increase the angle of attack of the flap to a maximum at its extreme extension, but obviously the angular motion of the flap can be predetermined as desired by proper shaping of either track.

With this arrangement the movement of the flap relative to the upper surface of the wing can be closely controlled as desired, so that the flap can function as a smooth continuation thereof at partial projections, to provide the most efficient lift increasing effect as for take-off, while at further projections the flap can be increasingly tilted downwardly to increase the drag effect and thus serve more efficiently as a landing brake, while also reducing the wing loading.

In order to fair the retracted flap into the wing profile, I have provided eccentric adjustments for two of the pivots in the quadrilateral figure, as shown in Figure V. By mounting the end 37 of the link 34 on an eccentric pin 38, adjustment of the eccentric pin distorts the quadrilateral figure to raise or lower the trailing edge of the flap to fair the same into the wing profile. A similar eccentric pin at 19 in the bracket 21 will fair in the leading edge of the flap. In practice it is preferable to adjust the leading edge before the trailing edge. After the adjustment has been made a lock plate 39 is applied over the head of the pin 38 to retain the adjustment.

The lower lever 17, in its partially extended position, requires a notch (not shown) in the lower skin 12 of the wing, ahead of the flap pocket, this notch being conveniently closed when the flap is retracted by a piece of material 40 attached to the lever 17 adjacent its pivot 20 on the bracket 21.

It will thus be seen that I have provided an improved and simplified flap controlling and guiding mechanism that provides a predetermined control of the flap angle and position at all points of the travel thereof.

Having thus described my invention and the present preferred embodiment thereof, I desire to emphasize the fact that many modifications may be resorted to in a manner limited only by a just interpretation of the following claims.

I claim:

1. In combination with an airfoil and an extensible edge flap normally nested in a pocket adjacent the edge of said airfoil, a pair of guide tracks mounted in said airfoil adjacent each side of said flap, a pair of levers each supported by one of said guide tracks and movable thereon, said levers each having one end thereof pivotally attached to said flap in spaced relationship to each other, one of said levers having a two point support on its track whereby its angular position relative to said airfoil is determined by the angle or curvature of its track, the other of said levers being journaled at its other end in the other of said tracks whereby the relative angles and curvatures of said tracks varies the position of the free end of said second lever relative to the first lever, and a link pivotally connecting the free end of the second lever to said first lever whereby the link, the pair of levers and the spaced pivotal mounting thereof on the flap forms a deformable quadrilateral wherein movement of the free end of the second lever as restrained by the link is adapted to pivot said flap relative to the airfoil.

2. In the combination of claim 1, means for adjusting the position of the flap when nested in the airfoil, comprising eccentrically adjustable pivotal connections between oppositely disposed pivots of said levers, link and flap, one adjustable connection being adapted to align the leading edge of the flap into the airfoil profile and the other connection being adapted to align the trailing edge of the flap.

3. In combination with an airplane wing and an extensible trailing edge flap normally nested in a pocket beneath said wing, a mounting for controlling said flap including a pair of levers having spaced pivotal connections at one end to said flap, a pivoted link extending from the other end of one lever to an intermediate point on the other lever, the pivotal points defining a quadrilateral, and guiding means cooperating with said levers to shift one end of the pivoted link relative to the other lever whereby to distort said quadrilateral and thereby produce pivotal movement of the flap due to relative movements between the spaced pivotal connections of the levers engaging the flap.

4. In combination with an airplane wing and an extensible trailing edge flap normally nested in a pocket beneath said wing, a mounting for controlling said flap including a pair of levers having spaced pivotal connections at one end to said flap, a pivoted link extending from the other end of one lever to an intermediate point on the other lever, the pivotal points defining a quadrilateral, and guide means for one of said levers for projecting said flap in a predetermined path, and guide means for the other lever adapted to vary the angular position of the pivoted link connecting said levers whereby to distort such quadrilateral with a corresponding angular change in the position of the flap forming a part thereof.

5. In combination with an airplane wing and an extensible edge flap normally housed therein in its retracted position, a mounting for guiding and controlling the extension of said flap, comprising a quadrilateral linkage having pivoted connections, the flap being adapted to form one side of said linkage, separate guiding means for the members of said linkage engaging said flap, said guiding means being adapted to variably shift the remaining side of said quadrilateral linkage whereby to alter the angle of said flap, and means for adjusting the initial arrangement of said quadrilateral linkage, comprising eccentric pivots in at least one of the corners thereof adapted to adjust the initial or nested position of said flap in said wing.

ELVIN O. RICHTER.